United States Patent [19]
Beckel

[11] 3,912,360
[45] Oct. 14, 1975

[54] MICROSCOPIC FIELD MARKER
[76] Inventor: Frank L. Beckel, Box 836, Eastville, Va. 23347
[22] Filed: Apr. 24, 1974
[21] Appl. No.: 463,812

[52] U.S. Cl. .................................. 350/92; 350/94
[51] Int. Cl.² ........................................ G02B 21/34
[58] Field of Search ............................. 350/92-95

[56] References Cited
UNITED STATES PATENTS
3,600,057  8/1971  Leffler ............................. 350/94 X
3,829,216  8/1974  Persidsky ......................... 350/94 X

*Primary Examiner*—Siegfried H. Grimm
*Attorney, Agent, or Firm*—Clarence A. O'Brien; Harvey B. Jacobson

[57] ABSTRACT

A microscopic slide marker placeable on a prepared slide, having concept-indicating means positionable by manipulative forceps (see co-pending application). The marker being transparent and having an optically-transparent adhesive and a patch of easily removable wax paper applied to one side, and being geometrically-configured, and variable in shape, to assist in pinpointing the salient features of the slide.

9 Claims, 8 Drawing Figures

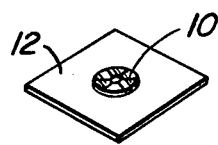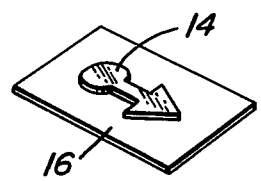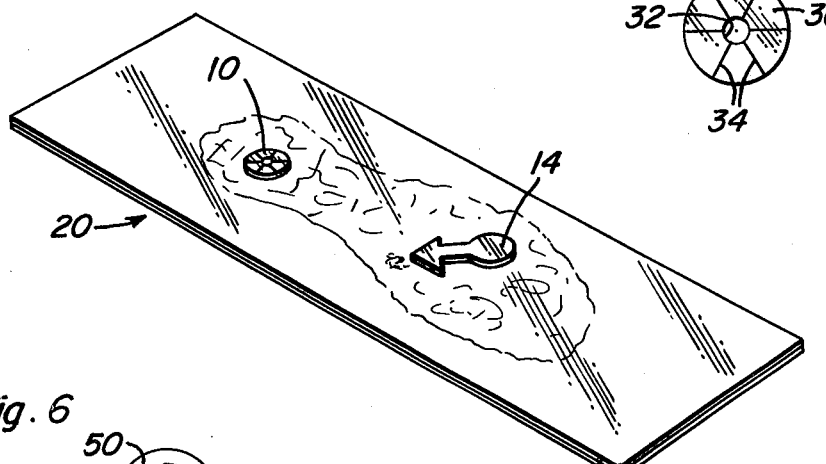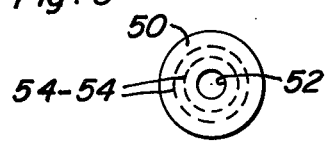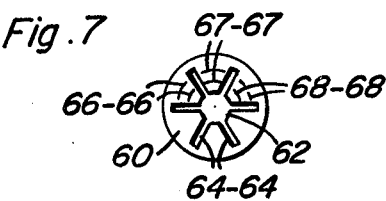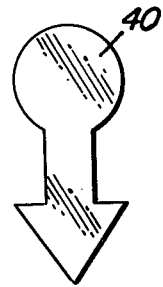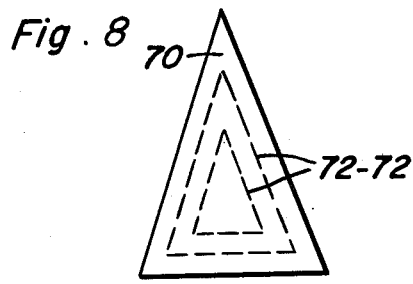

MICROSCOPIC FIELD MARKER

RELATED APPLICATION

This application is related to my co-pending application, Ser. No. 485,576, filed July 3, 1974, titled POSITIONING FORCEPS and the disclosure therein is incorporated herein by reference.

FIELD OF THE INVENTION AND SUMMARY OF THE PRIOR ART

Microscopic slides having through-holes for viewing specifically known specimens (e.g., fiber strands) are known, as evidenced by the Porter (No. 2,090,914, issued Aug. 24, 1937) patent; and similarly, slides for accepting cultures, smears, etc., and retaining the same by spring means are known, for example, in Robbins (No. 1,882,919, issued Oct. 18, 1932), as are transparent cover slips for slides, as in Busse (No. 2,342,918, issued Feb. 29, 1944). Variously configured markers are also known for conventional viewing (e.g., not microscopic) as in the various book-marks, decorative, and sign markers of Stechan No. 1,232,116, issued July 3, 1917), Oberheu (No. 1,676,835, issued July 10, 1928), and Bode (No. 2,096,389, issued Oct. 19, 1937).

SUMMARY OF THE INVENTION

Among the objects and advantages of this invention are the following:

A. To provide means for designating and re-locating areas of interest on microscopic slides.

B. To provide a plurality of diversely-configured markers for locating and/or re-locating spaced portions of a slide for subsequent review.

C. To provide means positionable on either, or both, sides of a slide, while the slide is under microscopic view, to assist a subsequent viewer (colleague, student, technician, etc.) in "finding" the area, or areas, of prime consideration to be viewed.

D. To provide marker means capable to having their internal and external configurations easily changed to pin-point areas of a magnitude of approximately 1/100,000th of a square inch.

E. To provide marker(s) which are semi-permanent, once applied to a slide; however, once the slide has lost its utility, the marker(s) may be removed for use upon a different slide.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 1 and 2 are perspective views of two preferred forms of transparent markers having a wax paper patch adhered to the adhesive side of each marker.

FIG. 3 is a perspective view of the preferred markers positioned to re-locate a desired area of viewing for a subsequent viewer.

FIG. 4 is a top plan view of a generally disk-shaped marker, with or without an aperture in the center.

FIG. 5 is similarly a top plan view showing a generally arrow-shaped marker, which again may or may not have apertures therein, as desired.

FIG. 6 is a modification of the FIG. 4 disk illustrating a series of concentric circular perforations therein.

FIG. 7 is a variant of both FIGS. 4 and 6 for shaping irregular areas to surround a portion of a slide to be viewed.

FIG. 8 is a further modification illustrating a marker having the general outline of an isosceles triangle and smaller isosceles triangles perforated therein.

DESCRIPTION OF THE PREFERRED EMBODIMENTS

In FIG. 1, a disk-shaped marker 10 is shown on a patch of wax paper 12, or similar readily removable sheet material; and, in FIG. 2, an arrow-shaped marker 14 is similarly temporarily adhered to a patch 16. Each of the markers is constructed of a transparent plastic material and preferably is approximately 1 mil thick and is provided with an optically-transparent adhesive on the surface adjacent the sheeting.

FIG. 3 illustrates one of each type marker 10 and 14 applied to a previously prepared microscopic slide 20; and, each marker has had the wax paper removed from its adhesive side prior to being positioned on and adhered to the prepared slide. Both the marker and adhesive have generally the same index of refraction as the glass from which the slide 20 is constructed.

The conventionally prepared slide consists of an upper transparent plate 22 and a lower transparent plate 24, with the culture, smear, specimen, etc. therebetween indicated at 26. Plural markers may be applied to either one, or both, of the plates 22 and 24 on a given slide.

Previously, the most widely used method of alerting significant parts of a slide to subsequent viewers was by dotting or circling the appropriate area of the prepared slide with pen and ink. However, in addition to being awkward and imprecise, the use of ink, even in small dots, on a prepared slide obscured portions of the slide from view under the microscope. Further, as the power of the microscope was increased, obviously, these ink spots took up larger and larger portions of the viewing area.

With the use of the transparent markers of my invention, the portions of the slide that are most important for viewing purposes may be pin-pointed, yet any blocking, or other impairment, of the to-be-viewed area is kept to an absolute minimum.

As viewed in FIG. 4, and by way of example only, the diameter of the disk 30 may be on the order of 2 millimeters, having a central aperture 32 that may vary in diameter from a fraction of a millimeter to just slightly less than the 2 millimeter diameter of the disk. In contrast, the disk 10 of FIG. 1 may be a solid, transparent disk with the illustrated "lines" thereon merely serving to further help locate and/or center the disk with respect to the area under observation which, as previously indicated, may be an area of only 1/100,000th of a square inch. FIG. 5 illustrates a single transparent arrow-shaped marker 40, approximately 5 millimeters in its longitudinal dimension and 1 or 2 millimeters in width at its narrowest portions.

FIGS. 6, 7, and 8 are exemplary variants on the markers of FIGS. 4 and 5. In the FIG. 6 modification, marker 50 has a central aperture 52 surrounded by one, or more, circular, concentric, perforated, easily removable portions 54–54. One, or more, of these concentric circular portions may be punched-out by inserting hypodermic needles, of appropriate diameter, through the central aperture 52, or by using the tips of the forceps of my co-pending application, or similar means.

The FIG. 7 modification is over-exaggerated to show that the lines as viewed in FIGS. 1, 3, and 4 of the illustrated disks may actually be slits which extend from the central aperture almost to the peripheral edge of the disk. Here, disk 60 has a central aperture 62 with slits 64—64 radiating therefrom, but not quite reaching the periphery of disk 60. By way of illustration only, the bottom three segments within disk 60 are left uncreased and unperforated, while the top left segment has curved crease lines 66—66, the top central segment has straight crease lines 67—67, and the top right segment has curved perforations 68—68. Such diverse variations allowing the user of the marker to fashion an irregular, or otherwise non-uniformly dimensioned area to surround a desired feature on a given slide, again, by using needles, forceps, etc.

FIG. 8 illustrates a further modification of the previously described markers. Here, the marker 70 is of an overall shape approximating an isosceles triangle with the height dimension being approximately twice the dimension of the base (the overall dimensions being approximately the same as those given in connection with FIG. 5). Within marker 70 are one, or more, perforated, generally concentric isosceles triangles 72—72. Again one, or more, of these inner perforated triangles may be punched-out, previously noted, by appropriate means. Thus, such triangular markers could be used to either "point" to a "dormant" or "infected" area; or, if punched-out, they could be used to surround an item under observation, such as a sperm cell. Still further, the centermost perforated triangle could be completely punched out, but the next perforated triangle only partially punched-out, folded-back upon itself, to leave a still differently dimensioned triangle to surround the area of interest yet still leaving sufficient adhesive area to hold the marker to either the top or bottom plate of a slide.

The markers may further vary in both their shapes and dimensions; and, they may be color-coded or otherwise bear suitable indicia, as needed.

In use, under a low-power magnification, the markers may be removed from their wax paper patches (FIGS. 1 and 2) by placing the patch on a curved portion of the viewer's finger, then grasping a marker with the forceps of my co-pending application; and, under higher magnification, the viewer may then position each marker, making any change in its configuration, as noted above, prior to pressing the marker against one of the plates of the slide. Again, one or more of the same, or differently configured, markers may be placed on opposite sides of the microscopic slide. Once the desired number and location of the markers has been positioned and determined, the slide is ready for subsequent viewing.

While prepared slides usually have a reasonably lengthy "use", some must be discarded in a fairly short length of time; thus, the replaceable feature of the markers (e.g., merely applying an adhesive solvent to the to-be-discarded slide, and then removing the one, or more, markers) is of special importance to those supervising the work of students and/or technicians.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a microscopic slide including upper and lower transparent plates with the material to be viewed sandwiched therebetween, a locating and identifying, generally geometrically-configured, transparent, concept-indicating means, said means being capable of alerting the viewer to an area of the magnitude of approximately 1/100,000th of a square inch, and having an optically transparent adhesive layer on one side and a patch of readily removable sheeting attached to said adhesive layer, once said readily removable sheeting is removed, said means being positionable at a desired location on one of said plates to direct subsequent viewers in locating a point of interest in the material sandwiched between said plates, the transparent aspect of said means allowing complete viewing of the material between the plates yet pin-pointing an area of special interest to those viewing the same.

2. The combination of claim 1 wherein said means includes a plurality of either the same or diversely-configured means, and one or more of said plurality are placed upon one or both of the plates of the slide.

3. The combination of claim 1, wherein said means is disk-shaped and has lines radiating from a central portion thereof.

4. The combination of claim 2, wherein said means is disk-shaped and has lines radiating from a central portion thereof.

5. The combination of claim 1 wherein said means is disk-shaped and has a centrally-located aperture therein.

6. The combination of claim 2, wherein said means is disk-shaped and has centrally-located apertures therein.

7. The combination of claim 2, wherein said means has multiple perforations therein whereby a user may punch an aperture therein and said aperture is variable in diameter.

8. The combination of claim 7, wherein said aperture may be punched-out, or folded, to form a non-uniform configuration in the central area.

9. The combination of claim 8, wherein plural apertures may be punched-out, or folded, to form a non-uniform configuration in the central area.

* * * * *